(12) United States Patent
Dunn

(10) Patent No.: US 7,537,426 B1
(45) Date of Patent: May 26, 2009

(54) ROOFER DUMP CART WITH HOPPER

(76) Inventor: Roy A. Dunn, 54909 Cedar Ridge Rd., California, MO (US) 65018

( * ) Notice: Subject to any disclaimer, the term of this patent is extended or adjusted under 35 U.S.C. 154(b) by 0 days.

(21) Appl. No.: 11/509,985

(22) Filed: Aug. 25, 2006

(51) Int. Cl.
*B60P 1/02* (2006.01)

(52) U.S. Cl. .................. 414/495; 414/414; 414/422

(58) Field of Classification Search .......... 414/414, 414/10, 810, 495, 519, 458; 298/24, 27; 52/749.12
See application file for complete search history.

(56) References Cited

U.S. PATENT DOCUMENTS

| | | | | |
|---|---|---|---|---|
| 181,219 | A | * | 8/1876 | Snyder .................. 105/253 |
| 1,659,109 | A | * | 2/1928 | Lawrence ................ 298/27 |
| 1,749,805 | A | * | 3/1930 | Elliott .................... 404/108 |
| 3,412,883 | A | * | 11/1968 | Birdsall .................. 414/470 |
| 3,700,283 | A | * | 10/1972 | Birdsall .................. 298/7 |
| 4,026,441 | A | * | 5/1977 | Jones .................... 222/609 |
| 4,365,841 | A | * | 12/1982 | McLaughlin ............ 298/27 |
| 4,854,804 | A | | 8/1989 | Mayle |
| 4,923,358 | A | | 5/1990 | Van Mill |
| 5,454,625 | A | | 10/1995 | Christensen et al. |
| 5,570,524 | A | | 11/1996 | Groat |
| 6,056,027 | A | | 5/2000 | Patterson |
| 6,065,410 | A | | 5/2000 | Dunham et al. |
| 6,113,340 | A | | 9/2000 | Zalal |
| 6,354,784 | B1 | * | 3/2002 | Farr ..................... 414/414 |
| 6,543,126 | B1 | | 4/2003 | Hamlin |
| 6,817,677 | B1 | | 11/2004 | Beiler |
| 2004/0123554 | A1 | * | 7/2004 | Slack .................. 52/749.12 |

* cited by examiner

*Primary Examiner*—Saúl J Rodríguez
*Assistant Examiner*—Joshua I Rudawitz
(74) *Attorney, Agent, or Firm*—Robert C. Montgomery

(57) ABSTRACT

An adjustable hopper for aiding in the transportation of old roofing material, such as shingles, to a refuse dumpster is herein disclosed. The hopper is inwardly tapered towards a false bottom and has a manually actuating release lever for vacating the contents through said false bottom. The hopper assembly is mounted on four height-adjustable leg assemblies manipulated by a handle. The hopper and leg assemblies are mounted on a support frame with heavy-duty caster wheel assemblies at each of four corners. The support frame is constructed so as to enable the entire hopper assembly to be positioned about a conventional refuse dumpster with a minimal amount of clearance.

9 Claims, 6 Drawing Sheets

ROOFER DUMP CART WITH HOPPER

RELATED APPLICATIONS

The present invention was first described in Disclosure Document No. 580,695 filed on Jun. 23, 2005. Other than stated herein, there are no previously filed, nor currently any co-pending non-provisional applications, anywhere in the world.

FIELD OF THE INVENTION

The present invention is an apparatus that aids in the transportation of old roofing material from the roof to a refuse dumpster comprising a hopper with a false bottom telescopically mounted onto a wheeled base.

BACKGROUND OF THE INVENTION

Anyone involved in the roofing business will tell you what a strenuous business it is. A typical day involves carrying heavy loads, enduring high temperatures and scorching sun and climbing steep roofs, all the while working at dangerous elevations above ground. Anything that reduces work or allows for a better job is welcome. Those roofing jobs which require the removal of the old roof, or a "tear-off" as it is commonly called, requires a much higher level of physical work. The old shingles must be dislodged, ripped up, and then pushed off of the roof. The physical activity required to transport these materials from the roof to the dumpster or refuse vehicle is staggering. Additionally, as these materials fall from the roof to the ground, damage to landscaping or even the house itself can occur. Finally, additional aids such as tarps or wheel barrows are required to pickup the material from the ground.

Several attempts have been made in the past to provide an apparatus for assisting in the transportation of roofing waste materials. U.S. Pat. No. 6,817,677 in the name of Beiler discloses a self-propelled trailer comprising a box-like bin with a tailgate with provisions to raise the bin to the height of the eaves of roofs via hydraulic pistons. The Beiler device requires transportation via motor vehicles to the job site and the hydraulic pistons require maintenance. The present invention, contrastingly, may be transported manually to and from a job site and a dumpster and simply telescopes up and down.

U.S. Pat. No. 6,113,340 issued in the name of Zalal provides an apparatus for an automatic debris removal system comprising a tilting dumpster riding on a carriage device of a pre-existing construction hoist, a detachable chute device, and an automatic dumping mechanism for the dumpster. The Zalal invention requires the use of a pre-existing construction hoist which may not be present on a particular jobsite.

U.S. Pat. No. 4,854,804 issued in the name of Mayle describes a an apparatus for lifting and carrying heavy loads comprising a steerable trolley-like device with a winch for moving a load onto an optional pan and a pair of lifting arms to move said load between the ground and roof. The Mayle device lacks the inherent benefit of removing the load through a false bottom, a feature in the present invention.

U.S. Pat. No. 5,570,524 issued in the name of Groat discloses a snow removal system for roofs and vehicles consisting of differing embodiments centered around a bermed tarp acting as a chute. Groat discloses a device that utilizes material not suited for removal of roofing debris and does not provide means to transport collected refuse to a sanitation dumpster.

U.S. Pat. No. 6,543,126 issued in the name of Hamlin describes a machine for loading and removing a flat roof comprising a flat conveyor belt on a pair of drive wheels and a chisel-like front member. A drive mechanism operates the conveyor belt to unload the old roofing material upward and outward, which needs to be scored so that it breaks as it ascends the conveyor and drops into a cart. The Hamlin invention utilizes a driven conveyor system to transport material and does not benefit from a simple and manually operated hopper dump system. The Hamlin invention is also highly specialized for removing flat roofing material prior to reparations or replacement.

U.S. Pat. No. 6,056,027 issued in the name of Patterson describes an apparatus and method for accurately measuring and dispensing dry material into a portable container. The Patterson apparatus is concerned with the accurate measuring of material and is therefore not within the scope of the present invention.

U.S. Pat. No. 4,923,358 issued in the name of Van Mill discloses a portable cart with an angular discharge auger, particularly for handling granular material. The auger tube is fixed to the hopper sump for drawing material from said sump and can be pivoted away during transport. The present invention handles material of a larger and bulkier nature than that of the device in the Van Mill patent and therefore does not benefit from the use of an auger. Additionally, the Van Mill device has no provisions for vertically manipulating the hopper structure to a job site.

U.S. Pat. No. 5,454,625 issued in the name of Christensen et al. discloses a portable ice cart with both elevation and tilt adjustment for an ice hopper. The Christensen et al. device utilizes a scissor-like linkage operated by a foot pedal actuating hydraulic cylinder for raising the ice hopper. The present invention utilizes a simple telescopic means for raising and lowering the hopper portion as opposed to the hydraulic system in the Christensen et al. apparatus.

None of the prior art particularly describes an apparatus that allows roofers to easily remove discarded roofing materials in a timely fashion without damage to landscaping and without excessive physical labor. Accordingly, there exists a need for a means by which the transportation of discarded roofing materials from the roof to the refuse container can be accomplished in an easier manner than current methods allow.

SUMMARY OF THE INVENTION

In view of the foregoing disadvantages inherent in the prior art, it has been observed that there is a need for a device to collect and remove roofing materials or other objects from elevated heights for subsequent removal to a sanitation device.

It has further been observed that there is a need for an apparatus that may be elevated in a simple and effective manner from a lower ground position to an upper position adjacent to, or abutting against, a roof or other elevated job site.

The object of the invention is to provide an apparatus that collects and retains removed roofing materials from a job site into a hopper structure.

It is a further object of the invention to elevate the hopper structure via telescopic support legs to a roof or other elevated job site to minimize the effort in collecting and retaining removed roofing materials.

It is a further object of the invention to transport the collected and retained removed roofing materials to a refuse container on a wheeled support frame.

It is yet a further object of the present invention to provide a wheeled support frame with the proper clearance around a conventional roll-off dumpster or other common commercial refuse container, while the hopper structure is in its elevated state.

Still yet another object of the invention is to provide a handle to hingedly release a false bottom in order to release the contents of the hopper structure into a conventional refuse container.

To achieve the above and other objectives, the present invention provides a method for the collection, retention, and removal of roofing materials loaded within an elevated and transportable dump hopper, and the transportation of said roofing materials within the elevated dump hopper to a conventional refuse container, such as a roll-off dumpster, via a wheeled support frame that provides the needed clearance for the subsequent release of the false bottom of the hopper structure to remove the contents of the hopper structure directly into the refuse container.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
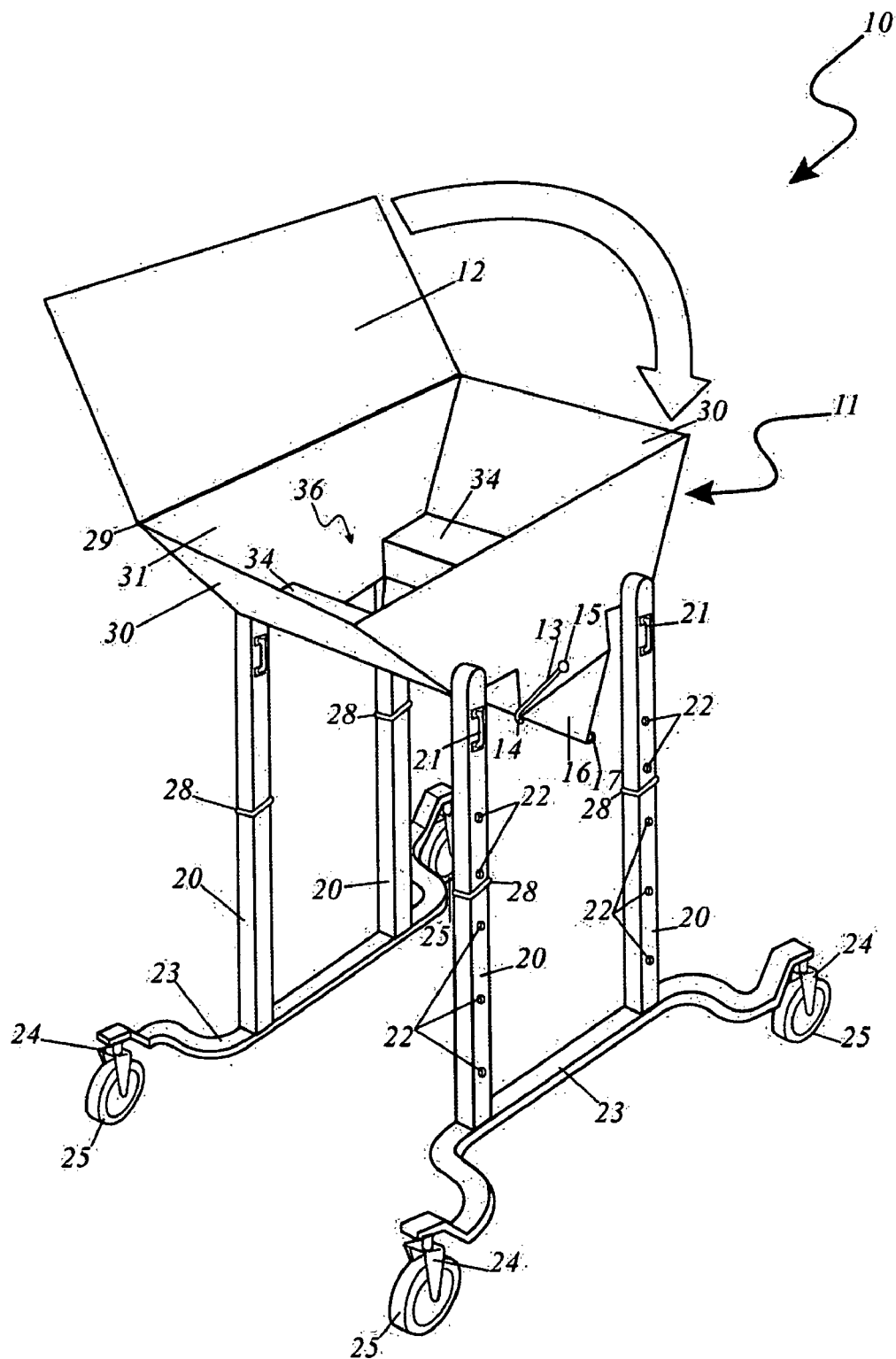
FIG. 1 is a perspective view of the roof shingle removal device 10, according to a preferred embodiment of the present invention; and, FIG. 2 is a side elevation view of the roof shingle removal device 10, according to a preferred embodiment of the present invention; and, FIG. 3a is a top view of the hopper structure 11 with a bottom opening door 16, according to a preferred embodiment of the present invention; and, FIG. 3b is a perspective view of the hopper extension device 32, according to a preferred embodiment of the present invention.

DESCRIPTIVE KEY 10 roof shingle dump cart
11 hopper structure
12 lid
13 release lever
14 hook
15 knob
16 false bottom
17 catch
20 adjustable leg
21 handle
22 adjustment hole
23 support structure
24 caster wheel suspension
25 caster wheel
27 lid handle
28 coupling
29 hinge
30 top/bottom hopper lip
31 side hopper lip
32 hopper extension device
33 extension supporter/adjuster
34 hopper bottom
35 hopper sump side walls
36 hopper sump

DETAILED DESCRIPTION OF THE PREFERRED EMBODIMENT

The best mode for carrying out the invention is presented in terms of its preferred embodiment, herein depicted within FIGS. 1 through 3b. However the invention is not limited to the described embodiment, and a person skilled in the art will appreciate that many other embodiments of the invention are possible without deviating from the basic concept of the invention. Any such work around will also fall under the scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for assisting in the transportation of old roofing material. The roof shingle dump cart with hopper (herein described as the "apparatus") 10 consists of a hopper system, an adjustable leg assembly, and a caster wheel assembly.

Figure 2:
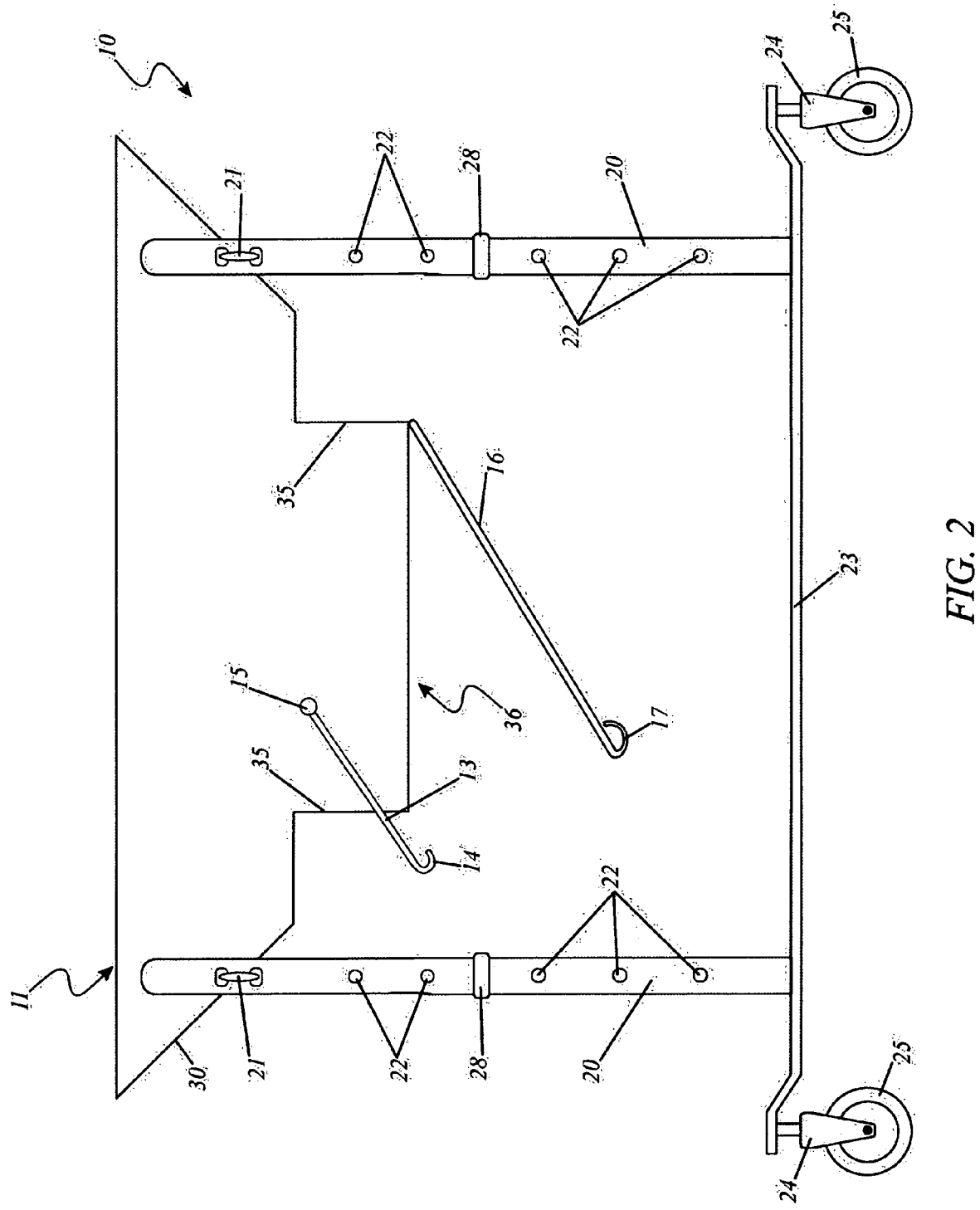
Figure 3A:
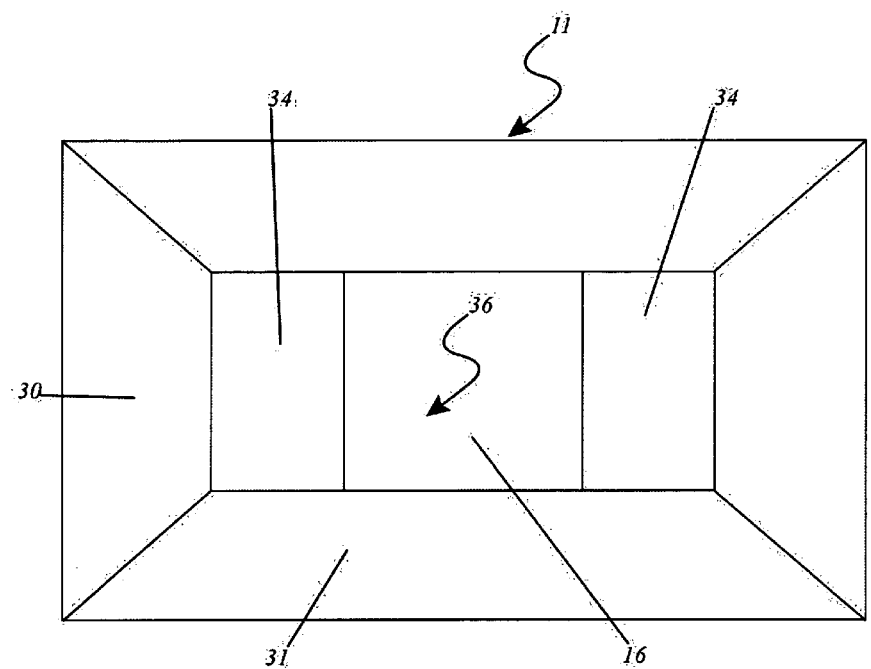
Figure 3B:
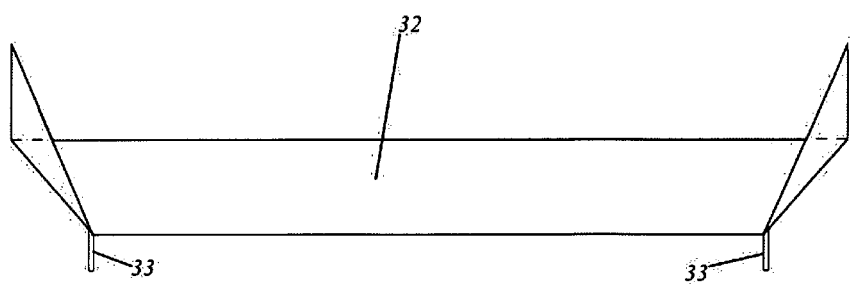
Figure 4:
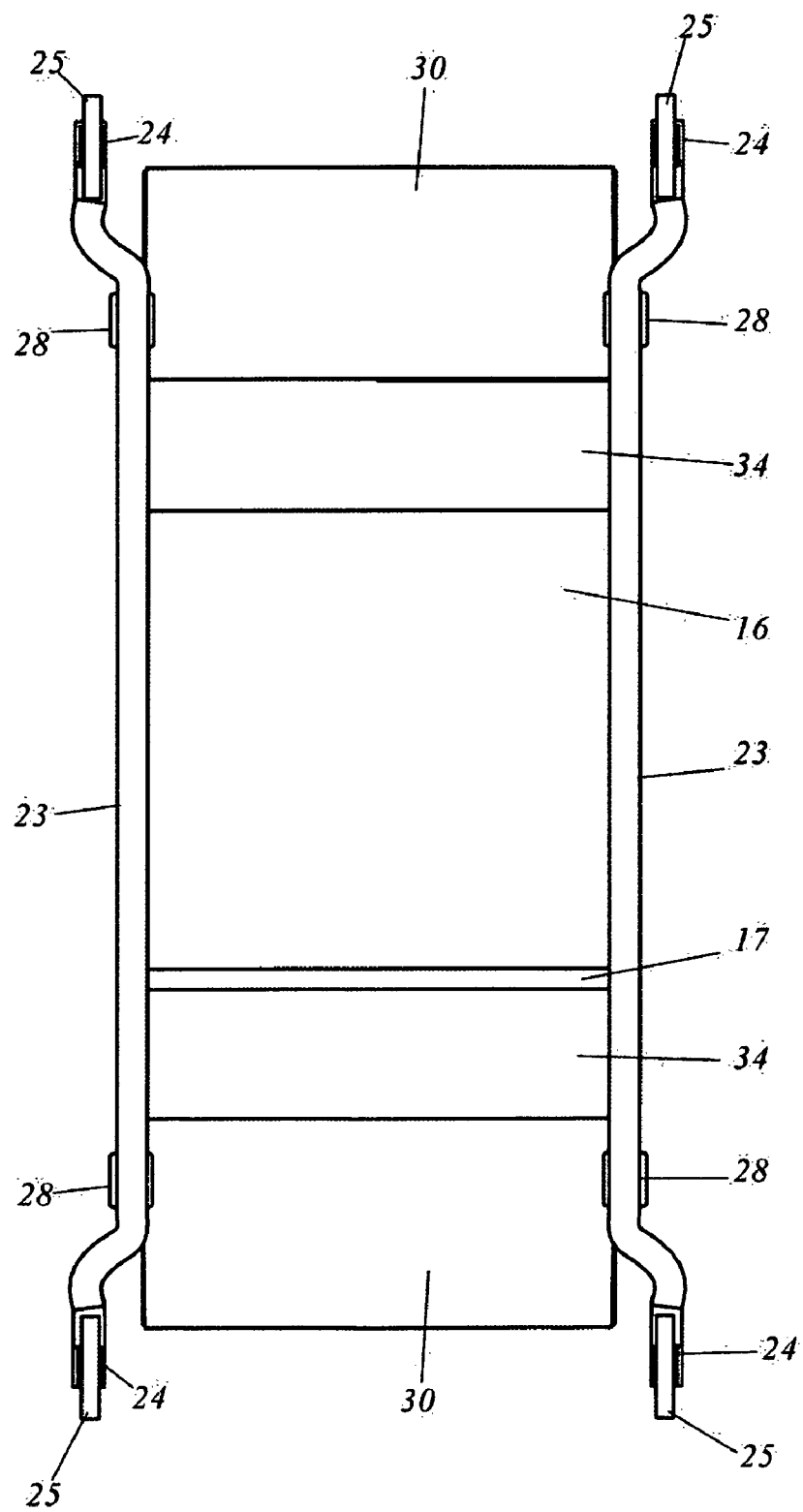
FIG. 4 is a bottom view of the roof shingle removal device 10, according to a preferred embodiment of the present invention; and, FIG. 5 is a top view of the roof shingle removal device 10, according to a preferred embodiment of the present invention; and, FIG. 6 is a front elevation view of the roof shingle removal device 10, according to a preferred embodiment of the present invention.
Figure 5:
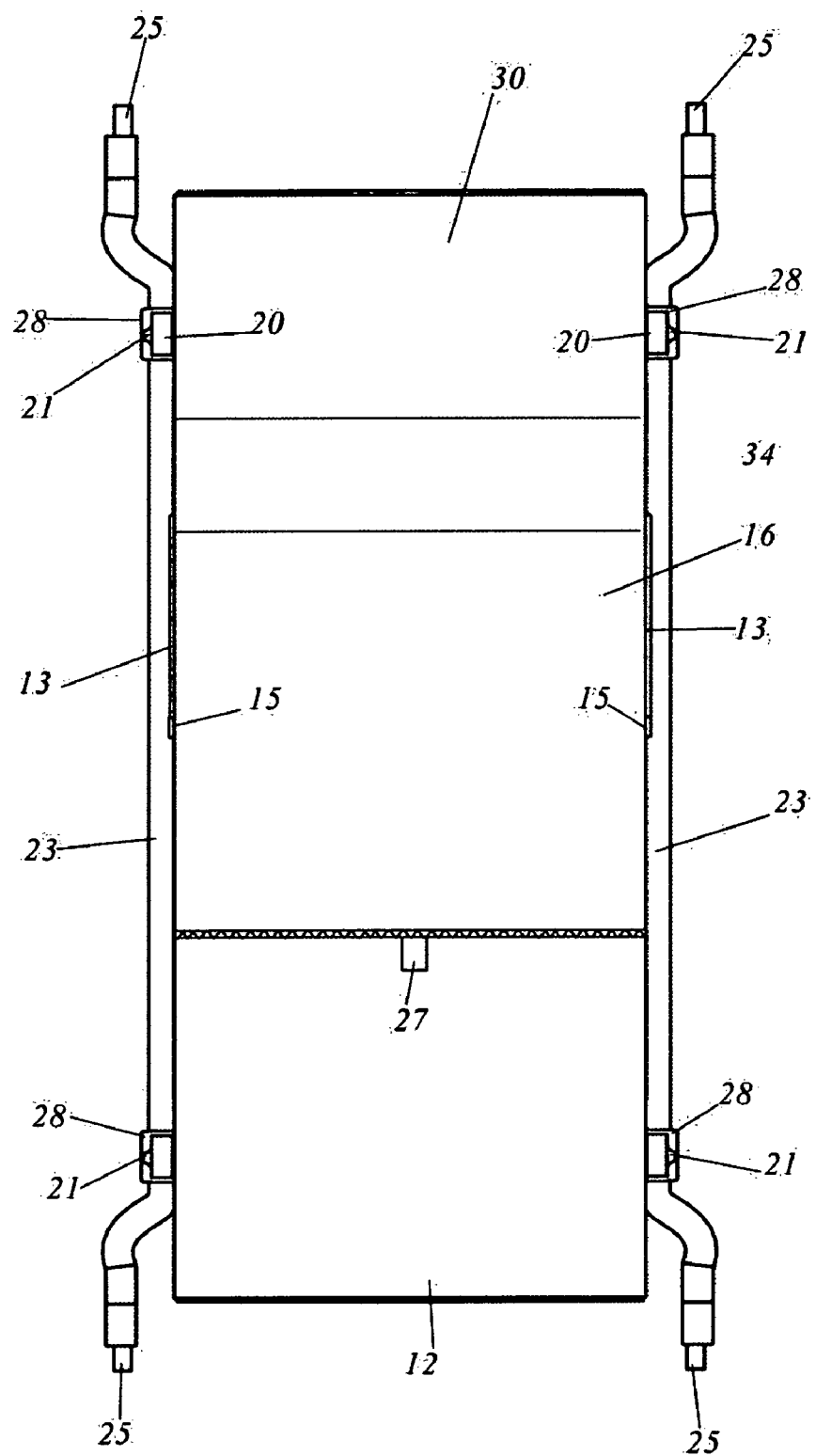
Figure 6:
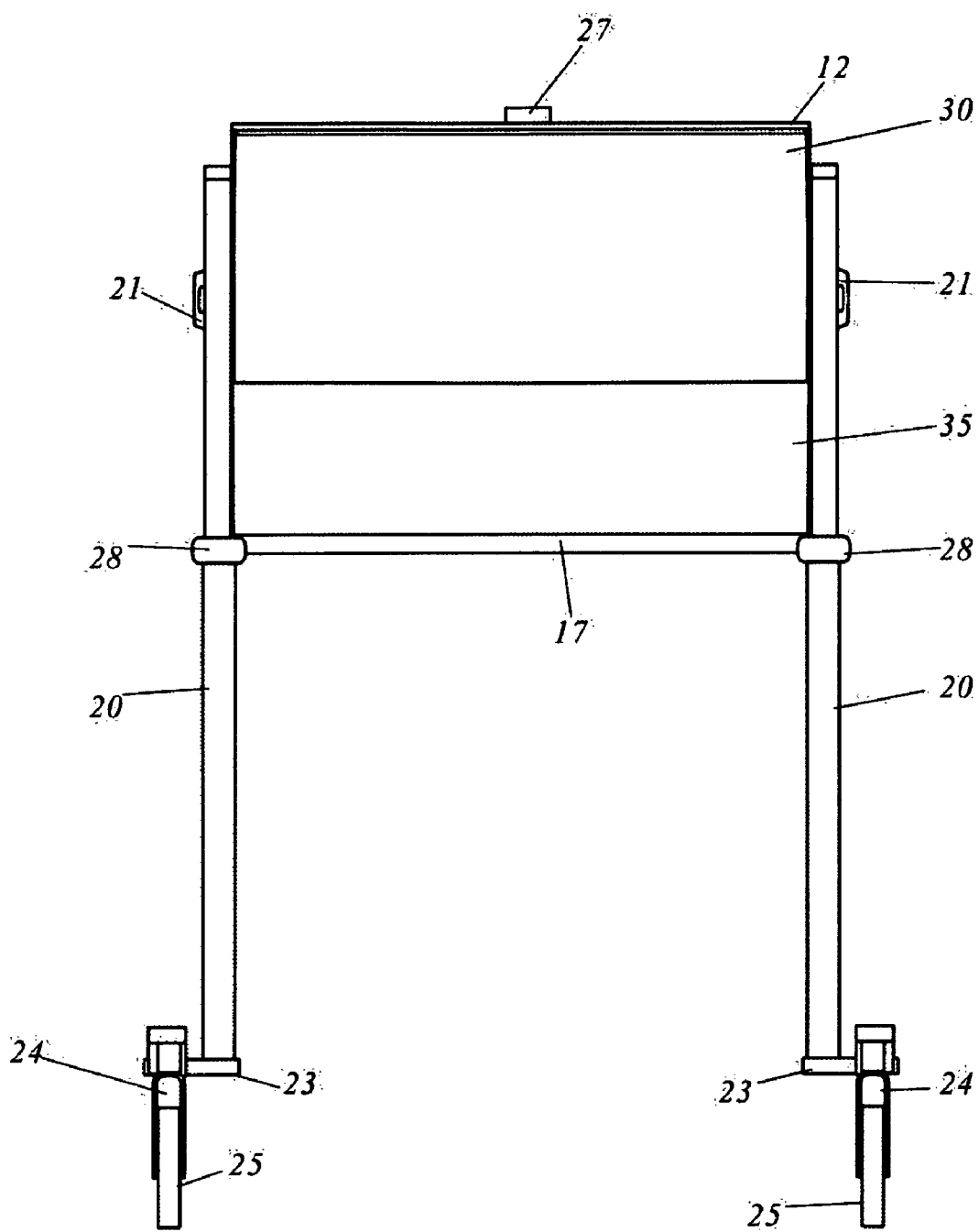

Referring now to FIGS. 1-3, the apparatus 10 takes the form of an elevated hopper system. The hopper assembly consists of a hopper 11 preferably comprised of a resilient material, such as steel in an extrusion, stamping, and bending process; a false bottom 16 hingedly connected to the bottom of the hopper 11; a lid 12 with a lid handle 27 hingedly connected to the top of the hopper 11; and a hopper extension device 32. FIG. 3a depicts the angular interior of the hopper 11 allowing the gravitational effect to progress the discarded contents towards the hopper bottom 34 and the false bottom 16, which has a catch 17 on it to hook onto a release lever 13. The hopper 11 generally is a reverse pyramidal structure with two (2) long inwardly sloping sides 31 and two (2) short inwardly sloping sides 30. Each sloping side 30, 31 slopes downward to the hopper sump 36 defined as a centrally dissected hopper bottom 34. The centrally dissected area comprises two (2) opposing vertically downward sloping dumper sump side walls 35 to a hingedly attached false bottom 16. At least one (1) release lever 13, which retains the false bottom 16 in a closed position with a hook 14 engaging the catch 17, disengages the false bottom 16, providing an aperture for the discarded contents to flow through. The release lever(s) 13 also have a knob 15 on the opposite end of the hook 14 for one to grasp and are attached to the exterior of the dumper sump side walls 35. The length of the hopper 11 can be extended by the use of the hopper extension device 32 to accommodate the conventional width of roofs. The hopper extension device 32 is attached to the hopper 11 via two adjustable lid supports 33 removably attachable to the lid 12. FIGS. 3a and 3b depict the use of the supports and adjusters.

The hopper 11 has four (4) opposing upwardly adjustable legs 20 that contain a plurality of aligned adjustment holes 22 drilled therethrough. The adjustable legs 20 may be fabricated out of the same material as the hopper assembly. The adjustable leg assembly consists of adjustable legs 20, adjustment holes 22, and a handle 21. The adjustable legs 20 comprise two (2) nested hollow legs, either tubular or rectangular, which are joined together by a coupling 28 and containing aligned adjustment holes 22 drilled therethrough, capable of extending the adjustable legs 20 to the desired height for accommodating differing roof heights and differing refuse containers. A locking pin or similar device can secure the vertical adjustment of the legs 20. The adjustable legs 20 can be elevated by the use of the handles 21 attached to each adjustable leg 20 by mechanical fasteners. A piece of flat iron connects the handles 21 permitting a single person manipulate the telescoping legs 20. The adjustable leg assembly is attached to the outer surface of the side walls of the hopper 11 via conventional material fastening means.

The wheel assembly preferably comprises caster wheels 25, a wheel suspension 24, and a support structure 23. The caster wheels 25 and the wheel suspension 24 are secured to the support structure 23 and configured in such a way which allows the caster wheels 25 to swivel in a 360° arc and to also employ locking means. The support structure 23 is configured in a curvature method over the wheel suspension 24 to provide extra stability and to allow the apparatus 10 to straddle the back of a pick up truck and/or refuse container. The size of the caster wheels 25 allows better mobility over uneven grades of terrain and prevents landscape from being trampled. The adjustable leg assembly is attached to the upper surface of the support structure 23 via mechanical fasteners or welding methods.

The preferred embodiment of the present invention is designed to be used by the common consumer with little or no special skills and minimal experience and training necessary. Likewise, experienced roofers, maintenance workers, and do-it-yourselfers can find this invention to greatly aid them in roofing, particularly in eliminating damage to property, eliminating possible injury to workers, and in assisting in clean-up to protect and maintain the environment. When the device is first procured, it should be made of a resilient material, such as steel with a suitable anti-corrosion finish, such as paint.

The method of utilizing the device may be achieved by performing the following steps: adjusting the legs 20 to the proper height; opening the hinged lid 12 with the lid handle 27; adjusting the lid supports 33 as necessary by sliding them upwards so the lid 12 reaches the edge of the roof; and attaching the hopper extension device 32 to the lid supports 33. Once the old shingles have been removed, and placed within the hopper 11, the disposable contents are ready to be vacated. The apparatus 10 can then be rolled over to a roll-off dumpster to dispose of the contents through the false bottom 16.

More specifically, the apparatus 10 rolls over to the job site by utilizing the swiveling caster wheels 25. The caster wheels 25 are large enough to allow easy rolling over rough surfaces and grades while preventing grass or landscaping from being tattered. The apparatus 10 can then be elevated by adjusting the height of the adjustable legs 20. The height is situated by the adjustment holes 22 to a convenient height at the roof eave level. At this height, the apparatus 10 can be above shrubbery, flowers, and other landscaping. The elongated span between the adjustable legs 20 not only provides stability but permits the straddling of the refuse containers. The stability is augmented even further with the curvature of the support structure 23. The apparatus 10 then needs to be strapped down or anchored and have the caster wheels 25 locked to prevent motion during the process of removing shingles. The lid 12 of the apparatus 10 must be opened by lifting the end that is not hinged to the hopper structure 11 or via the lid handle 27. The lid supports 33 slide upwards so that the lid 12 reaches the edge of roof.

The hopper structure 11 attached to the adjustable legs 20 is now elevated at a convenient height at the desired location. The elevated hopper structure 11 encompasses an aperture for old roofing material from the roof of the dwelling. The angular interior of the hopper structure 11 compels the discarded materials to flow to the bottom by gravitational effect. A hopper extension device 32 extends the aperture of the hopper structure 11 to accommodate the conventional width of roofs for further reach. The hopper extension device 32 is attached to the hopper structure 11 via two adjustable lid supports 33 attached to the lid 12.

Once the hopper structure 11 is filled with the old roofing materials, the apparatus 10 is unstrapped and the caster wheels 25 are unlocked, to transport the discarded contents to a roll-off dumpster or refuse container. The elevated apparatus 10 is now at a convenient height to straddle the roll-off dumpster or refuse container, with the false bottom 6 positioned above the interior of the dumpster. The discarded contents can then be vacated by using the release lever(s) 13. The release lever(s) 13 disengage the false bottom 16, by removing the hook portion 14 of the lever(s) 13 retaining the catch 17 of the false bottom 16 providing an aperture for the discarded contents to flow through. The false bottom 16 is hinged on one side of the hopper structure 11 to prevent discarded contents from exiting until the release lever 13 is pulled.

The elevation of the apparatus 10 also provides for easy transportation within the bed of a pickup truck.

Yet another embodiment of the present invention 10 is the use of the dump cart with hopper as a dumping mechanism for other materials such as old gutters, leaves and other grime found in gutters, or other similar discarded materials obtained from an elevation.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A dump hopper cart comprising:
  a hopper structure constructed out of resilient material for withstanding heavy-duty handling of removed roofing material; further comprising:
    an inwardly sloping hopper sump with a top portion and a bottom portion for receiving said removed roofing material;
    a releasable false bottom hingedly connected to said bottom of said inwardly sloping hopper sump for the gravitational removal of said removed roofing material; and,
    a hinged lid connected to said top portion of said inwardly sloping hopper sump for retaining said removed roofing material within said hopper sump, said lid having a lid handle;

at least four upstanding telescopic posts, each post fixedly connected at an upper end to the exterior of said hopper structure and each post further comprising:

a first hollow post slidably engaged within a second hollow post and retained therein with a coupling, adjustment holes drilled therethrough both said first hollow post and said second hollow post, said first hollow post is fixedly connected to an exterior surface of said hopper structure at an upper end and said second hollow post is fixedly connected to a wheeled support structure at a lower end;

height adjustment means wherein a locking pin is inserted said adjustment holes when said adjustment holes of said first hollow post and second hollow post are aligned; and, a handle attached to said first hollow post for assisting the vertical adjustment of said telescopic post assembly;

said wheeled support structure, further comprising;

two horizontal support frames running parallel to an inwardly sloping long side of said hopper structure, wherein said horizontal support frames are fixedly connected on an upper surface to said bottom end of said telescopic post assembly; and, a wheel assembly comprising a wheel mount and a wheel, wherein said wheel assembly is removably attached to each end of said horizontal support frame at said wheel mount;

wherein said wheeled support structure allows said hopper structure to be capable of straddling a refuse container with said false bottom positioned above an interior of said refuse container, thereby allowing said removed roofing material to be emptied therein said interior of said refuse container; and, wherein said dump hopper cart comprises a manual operating means, such that a single user can operate and manipulate said dump hopper cart without power assist means.

2. The hopper sump of claim 1, wherein said hopper sump further comprises two inwardly sloping long sides and two inwardly sloping short sides, said inwardly sloping long sides and inwardly sloping short sides slope inwards from said top portion to said bottom portion of said hopper sump, said bottom portion of said hopper sump further comprises:

a hopper bottom, said hopper bottom is rectangular in shape and dissected in a middle portion with two vertically downward sloping hopper sump side walls;

said releasable false bottom with a hinged connection to at least one vertically downward sloping hopper sump side wall and comprised of a plate with dimensions to cover said dissected middle portion of said hopper bottom and a catch located on the opposite of said hinged connection for retaining said false bottom in a closed position via at least one latch; and, said latch or said latches each with a hook for retaining said catch on said false bottom and a knob on its distal end, said latch or said latches each connected to an exterior surface of the opposite vertically downward sloping hopper sump wall from said hinged connection of said false bottom.

3. The telescopic post assembly of claim 1, wherein said first hollow post and said second hollow post are either cylindrical or rectangular in shape.

4. The horizontal support frame of claim 1, wherein said support frame curves outward and upward at said ends where said wheel assembly is mounted to provide said wheeled support frame with a required clearance to direct said wheeled support frame around said refuse container.

5. The dump hopper cart of claim 1, further comprising an anchoring means for securing said dump hopper cart.

6. The dump hopper cart of claim 1, further comprising a hopper extension device attached to said hopper structure via two adjustable lid supports removably attachable to said lid.

7. The dump hopper cart of claim 1, wherein each wheel assembly further comprises a caster wheel with position locking means enabling said wheel to swivel in any direction in which said wheel is pushed.

8. A method of removing roofing material utilizing a dump hopper cart, further comprising the steps of:

providing said dump hopper cart, comprising:

a hopper structure constructed out of resilient material for withstanding heavy-duty handling of removed roofing material; further comprising:

an inwardly sloping hopper sump with a top portion and a bottom portion for receiving said removed roofing material;

a releasable false bottom hingedly connected to said bottom of said inwardly sloping hopper sump for the gravitational removal of said removed roofing material; and, a hinged lid connected to said top portion of said inwardly sloping hopper sump for retaining said removed roofing material within said hopper sump, said lid having a lid handle;

at least four upstanding telescopic posts, each post fixedly connected at an upper end to the exterior of said hopper structure and each post further comprising:

a first hollow post slidably engaged within a second hollow post and retained therein with a coupling, adjustment holes drilled therethrough both said first hollow post and said second hollow post, said first hollow post is fixedly connected to an exterior surface of said hopper structure at an upper end and said second hollow post is fixedly connected to a wheeled support structure at a lower end;

height adjustment means wherein a locking pin is inserted said adjustment holes when said adjustment holes of said first hollow post and second hollow post are aligned; and, a handle attached to said first hollow post for assisting the vertical adjustment of said telescopic post assembly;

said wheeled support structure, further comprising;

two horizontal support frames running parallel to an inwardly sloping long side of said hopper structure, wherein said horizontal support frames are fixedly connected on an upper surface to said bottom end of said telescopic post assembly; and, a wheel assembly comprising a wheel mount and a wheel, wherein said wheel assembly is removably attached to each end of said horizontal support frame at said wheel mount;

wherein said wheeled support structure allows said hopper structure to be capable of straddling a refuse container with said false bottom positioned above an interior of said refuse container, thereby allowing said removed roofing material to be emptied therein said interior of said refuse container; and, wherein said dump hopper cart comprises a manual operating means, such that a single user can operate and manipulate said dump hopper cart without power assist means;

directing said hopper structure to a job site by manually steering said wheeled support structure;

vertically adjusting each of said at least four upstanding telescopic posts to a desired location by grasping said handle telescopic post assembly and raising said fixedly attached hopper structure;

securing said desired location by inserting said locking pin into each of said at least four upstanding telescopic posts;

placing said roofing material within said hopper structure;

transporting said roofing material within said hopper structure to said refuse container by steering said wheeled support structure;

releasing said roofing material by removing a latch retaining a catch on said false bottom of said hopper structure, said roofing material is introduced into said refuse container via gravity; and, lowering each of said at least four upstanding telescopic posts by removing said locking pin and manipulating each of said at least four upstanding telescopic posts with said handle downward to a desired lower position;

wherein said hopper structure further comprises said hinged lid with said lid handle such that said lid, when manually opened via said lid handle, provides access thereto an interior of said hopper structure for receiving said roofing material; and, wherein a proper use of said dump hopper cart eliminates damage to property, eliminates possible injury to workers, and assists in environmental clean-up.

9. The method of claim 8, further comprising the step of anchoring said wheeled support frame in place and situating said roofing material within said hopper structure.

* * * * *